(12) United States Patent
Wright

(10) Patent No.: US 8,806,229 B1
(45) Date of Patent: Aug. 12, 2014

(54) POWER REDUCTION CIRCUITS AND METHODS

(75) Inventor: David G. Wright, Woodinville, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 817 days.

(21) Appl. No.: 12/569,855

(22) Filed: Sep. 29, 2009

Related U.S. Application Data

(60) Provisional application No. 61/100,793, filed on Sep. 29, 2008.

(51) Int. Cl.
*G06F 1/00* (2006.01)
*G06F 1/26* (2006.01)

(52) U.S. Cl.
USPC ........... 713/300; 713/310; 713/320; 327/365; 327/404

(58) Field of Classification Search
CPC ............. G06F 1/18; G06F 1/189; G06F 1/32; G06F 1/1615
USPC ................... 713/300, 310, 320; 327/365, 404
See application file for complete search history.

(56) References Cited

U.S. PATENT DOCUMENTS

| | | | |
|---|---|---|---|
| 5,508,650 A * | 4/1996 | Grimm et al. | 327/365 |
| 5,535,398 A * | 7/1996 | Biggs et al. | 713/324 |
| 5,684,471 A | 11/1997 | Bernardi et al. | |
| 5,812,085 A | 9/1998 | Barraza et al. | |
| 6,269,449 B1 | 7/2001 | Kocis | |
| 6,335,636 B1 * | 1/2002 | Yeung et al. | 326/41 |
| 7,036,031 B2 | 4/2006 | Takeuchi | |
| 7,148,745 B1 | 12/2006 | Moscaluk | |
| 7,176,902 B2 | 2/2007 | Peterson, Jr. et al. | |
| 7,339,359 B2 * | 3/2008 | Choi et al. | 323/284 |
| 7,482,907 B2 | 1/2009 | Denison et al. | |
| 7,568,177 B1 * | 7/2009 | Soebroto et al. | 716/120 |
| 2002/0063608 A1 * | 5/2002 | Sutliff et al. | 331/108 D |
| 2003/0075735 A1 * | 4/2003 | Nakano | 257/200 |
| 2007/0013523 A1 | 1/2007 | Paradiso et al. | |
| 2007/0096949 A1 | 5/2007 | Wright et al. | |
| 2007/0202932 A1 | 8/2007 | Keller | |
| 2008/0297242 A1 * | 12/2008 | Vig et al. | 327/576 |
| 2009/0002217 A1 | 1/2009 | Kryze et al. | |
| 2009/0146605 A1 | 6/2009 | Uchiyama et al. | |

OTHER PUBLICATIONS

Di Pietro, Alessandra, "Reduced standby mode energy use", Power Management Design Line, Jul. 9, 2009, Internet at http://www.powermanagementdesignline.com/howto/powersupplies/218500102; jsessionid=Q113A02TFOGW2QSNDLPCKHOCJUNN2JVN?pgno=3.
Belkin International, Inc., "Conveniently Reduce Energy Consumption With Belkin's Conserve Surge Protector", Jan. 7, 2008, Internet at : http://www.belkin.com/pressroom/releases/uploads/01_07_08Conserve.html.
Maxim Integrated Products, Inc., "1-Wire Products Design Guide—4th Edition", Feb. 2009.

* cited by examiner

*Primary Examiner* — Kim Huynh
*Assistant Examiner* — Zahid Choudhury

(57) ABSTRACT

An integrated circuit device may include a plurality of external connections, any one of the connections providing both a power voltage path for the integrated circuit (IC) as well as an information signal path for the IC. At least one switch may be coupled to provide a power supply voltage to one of the external connections.

18 Claims, 10 Drawing Sheets

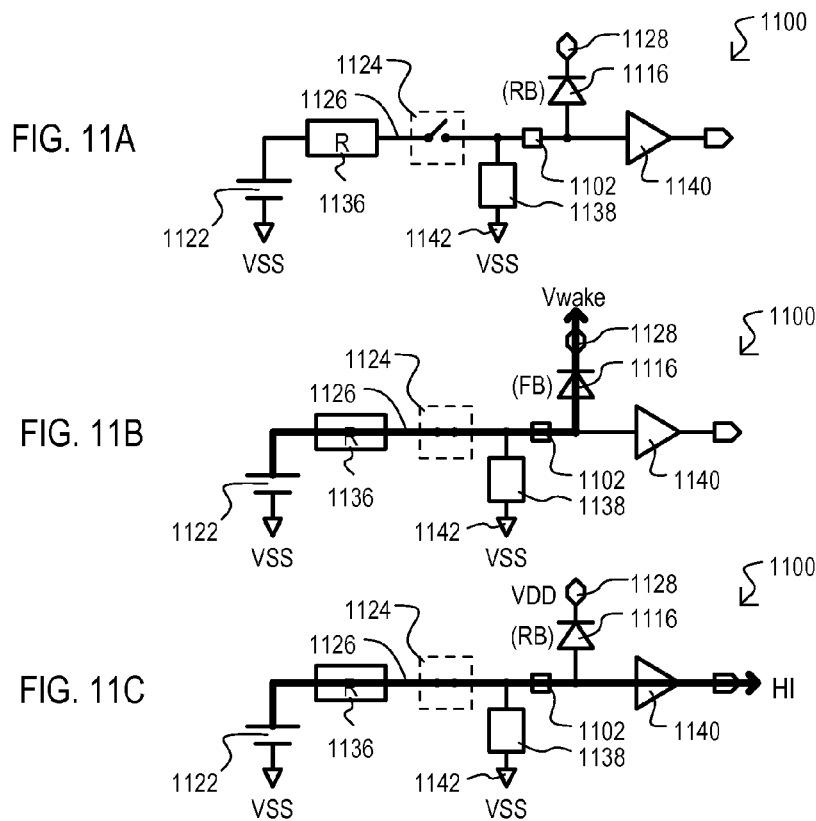
FIG. 11A
FIG. 11B
FIG. 11C
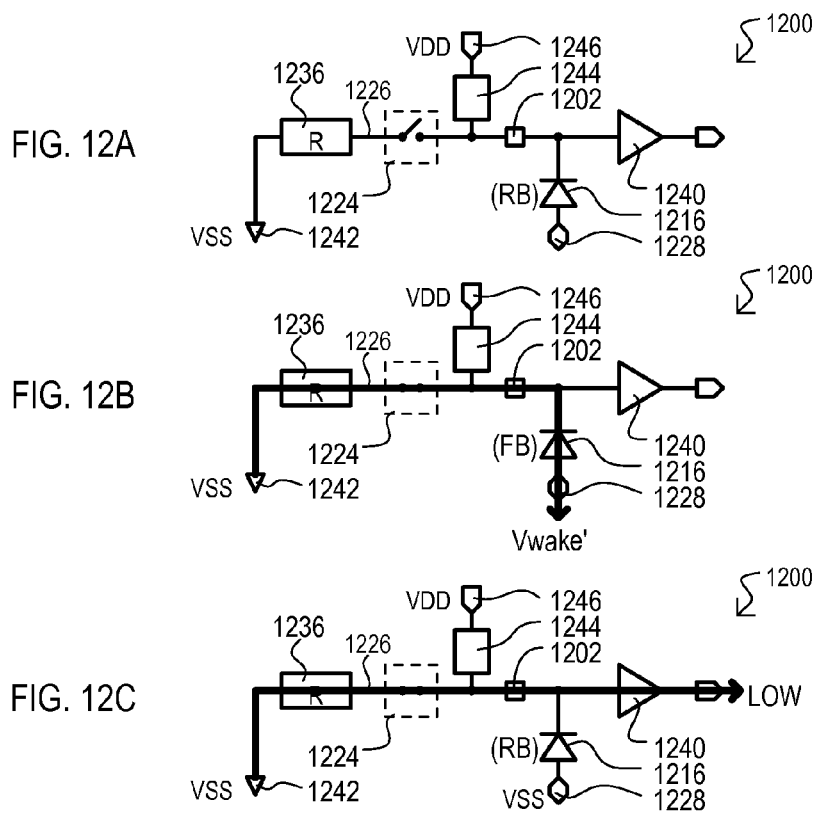
FIG. 12A
FIG. 12B
FIG. 12C

POWER REDUCTION CIRCUITS AND METHODS

This application claims the benefit of U.S. provisional patent application Ser. No. 61/100,793 filed on Sep. 29, 2008, the contents of which are incorporated by reference herein.

TECHNICAL FIELD

The present disclosure relates generally to integrated circuit devices, and more particularly to devices and methods for providing power to an integrated circuit device.

BRIEF DESCRIPTION OF THE DRAWINGS

FIGS. 11A to 11C are block schematic diagrams of pull-down input structures that may be included in embodiments.

FIGS. 12A to 12C are block schematic diagrams of pull-up input structures that may be included in embodiments.

DETAILED DESCRIPTION

Various embodiments will now be described that show devices and methods for providing power to an integrated circuit device. Such embodiments may allow an integrated circuit to switch from a low power state to a high power state according to an input signal at any one of a number of inputs. This is in contrast to device that switch power states in response to a dedicated input (e.g., "wake" input).

Figures 1A, 1B:
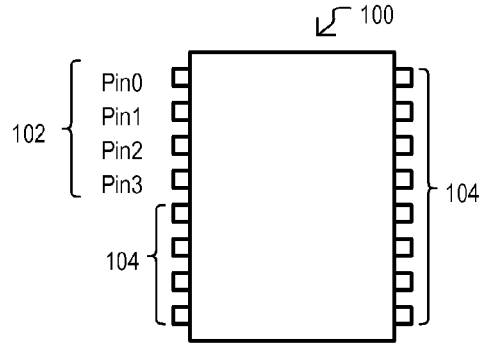
FIGS. 1A and 1B are a plan view and table showing an integrated circuit device according to a first embodiment.

Referring to FIGS. 1A and 1B, an integrated circuit device according to a first embodiment is shown in a plan view and designated by the general reference character 100. Device 100 may include an integrated circuit in packaged form with electrical connections for providing inputs to, or outputs from, the device. Such connections may be external package connections (e.g., leads, pins, balls), integrated circuit die connections (e.g., bond pads), or conductive paths between such points (e.g., bond wires, package traces)

The particular embodiment of FIGS. 1A and 1B shows a packaged integrated circuit device 100 with n+1 external pins, identified as pin "0" to pin "n". Pins 0 to 3 may be "multi-function" pins 102, while the remaining pins 104 may provide other functions or be non-connected pins, providing no function. In one very particular embodiment, none of the remaining pins 104 may be power supply pins. That is, power for the device may be derived from multi-function pins, and not any dedicated power supply pin (e.g., VCC or VDD pins).

As shown in FIG. 1B, multi-function pins 102 may be both input and power supply pins. That is, such pins may receive input signals representing data input, and at the same time, the application of any such inputs signal may be sufficient to power the device to execute predetermined functions. In some embodiments, such provided power may be "wake" power that enables a device 100 to switch from a low power consuming state (with little or no device functions), to a higher power consuming state (that may provide various functions). In other embodiments, such power may be operational power for executing device functions.

An embodiment like that of FIGS. 1A and 1B may be used in an electronic device to reduce power consumption. In one very particular embodiment, physical inputs of such an electronic device (e.g., buttons) may provide an input signal (and hence power) to the device. This may eliminate the use for a "wake" type button for switching the electronic device between different power consuming states.

In this way, an integrated circuit device may include external connections that may both power an integrated circuit device, as well as provide an information input signal to the integrated circuit device.

Figures 2A, 2B:
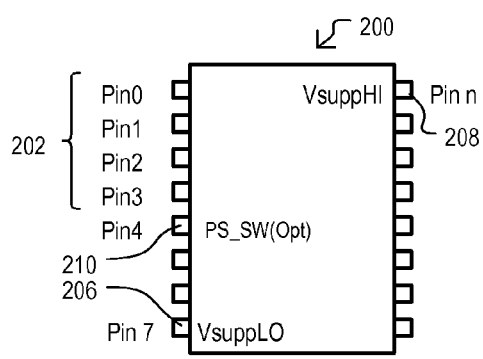
FIGS. 2A and 2B are a plan view and table showing an integrated circuit device according to another embodiment.

Referring to FIGS. 2A and 2B, an integrated circuit device according to a further embodiment is shown in a plan view and designated by the general reference character 200. Device 200 may include an integrated circuit in packaged form like that of FIG. 1A.

The particular embodiment of FIGS. 2A and 2B shows a packaged integrated circuit device 200 with n+1 external pins, identified as pin "0" to pin "n". Such pins (Pin 0 to Pin n) may include "multi-function" pins 202, a dedicated low power supply pin 206, and a dedicated high power supply pin 208.

As shown in FIG. 2B, multi-function pins 202 may be any of: an input connection, an output connection, or a wake connection. An input connection may be a connection for receiving an information signal. An output connection may be a connection for providing output signals. A wake connection may be a connection that "wakes" device 200 from a lower power consuming state to a higher power consuming state. More particularly, a wake connection may provide wake power to a device 200 that may enable the device 200 to switch between such different power consuming states. In one embodiment, all of multi-function pins 202 may provide wake connections, while any of multi-function pins 202 may be an input connection, an output connection or both input and output connection.

A low power supply connection 206 may be a dedicated connection for applying a low power supply voltage (e.g., VSS, ground) to a device 200. That is, such a connection does not provide either a data input or output connection. Similarly, high power supply connection 208 may be a dedicated connection for applying a high power supply voltage (e.g., VDD, VCC) to a device 200. That is, such a connection does not provide either a data input or output connection.

Optionally, a device 200 may include a power supply switch (PS_SW) output 210, shown in the particular embodiment of FIGS. 2A and 2B as pin 4. A PS_SW output 210 may provide a control signal for enabling a power supply switch (not shown) that connects a low power supply voltage to low power supply connection 206 and/or a high power supply voltage to a high power supply connection 208. In such an embodiment, upon receiving wake power via any of multi-function pins 202, a device 200 may output a power supply switch control signal on PS_SW output 210 to enable "standard" power supply voltages to be applied at high and low power supply connections 206 and 208. The application of standard power supply voltages may enable a device 200 to switch from a low power consuming, limited function state, to a higher power consuming, fully functional state.

In this way, an integrated circuit device may include external connections that may provide wake power to an integrated circuit device, as well as provide an information input or output signal to the integrated circuit device. At the same time, the device may have separate dedicated power supply connections.

Figures 3A, 3B:
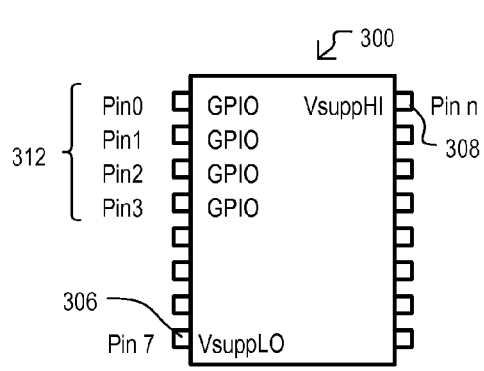
FIGS. 3A and 3B are a plan view and table showing an integrated circuit device according to a further embodiment.

Referring to FIGS. 3A and 3B, an integrated circuit device according to another embodiment is shown in a plan view and designated by the general reference character 300. Device 300 may include an integrated in packaged form like that of FIG. 1A.

The particular embodiment of FIGS. 3A and 3B shows a packaged integrated circuit device 300 with n+1 external pins, identified as pin "0" to pin "n". Such pins (Pin 0 to Pin n) may include general purpose input/output/wake (GPIO/wake) connections, 312, a dedicated low power supply pin 306, and a dedicated high power supply pin 308.

As shown in FIG. 3B, GPIO/wake pins 312 may be programmable between different modes (digital or analog). More particularly, when programmed as a digital connection, a GPIO/wake may be a digital input/output (I/O). However, when programmed as an analog connection, a GPIO/wake may be an analog input and a wake input. That is, such a connection may receive an input signal that may also wake device 300 from a lower power consuming state to a higher power consuming state. More particularly, like the embodiment of FIGS. 2A and 2B, such an analog input/wake connection may provide wake power to a device 300 that may enable the device 300 to switch between such different power consuming states.

Low and high power supply connections (306 and 308) may be like those of FIGS. 2A and 2B.

Optionally, one of GPIO/wake pins 312 may be programmed to provide a control signal for enabling a power supply switch (not shown), as described in the embodiment of FIGS. 2A and 2B.

In this way, an integrated circuit device may include general purpose I/Os that may also provide wake power to an integrated circuit device.

Figure 4:
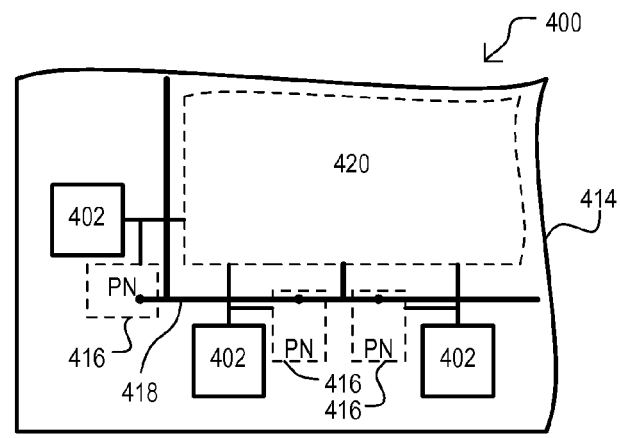
FIG. 4 is a partial plan view of an integrated circuit device according to another embodiment.

Referring now to FIG. 4, an integrated circuit device according to another embodiment is shown in a partial top plan view, and designated by the general reference character 400. Device 400 may be an integrated circuit formed in a substrate 414. Device 400 may include multi-function connections 402, corresponding p-n junctions 416, an internal power supply network 418, and a function circuit 420. It is noted that p-n junctions 416 may provide a "diode" like response: providing a low impedance path when exceeding a particular threshold voltage (i.e., is forward biased), and maintaining a high impedance path in response to voltages below such a threshold (i.e., is reverse biased). Accordingly, for this and other embodiments, other structures providing a diode like response may be utilized in place of, or in addition to, p-n junctions.

In one embodiment, multi-function connections 402 may be bond pads of an integrated circuit in die form. Each such connection 402 may have a conductive connection to a p-n junction 416 formed in a substrate 414. As will be described in other embodiments below, some or all of p-n junctions 416 may be a characteristic already present in circuits for receiving input signals and/or driving output signals on connections 402.

P-n junctions 416 may be conductively connected to power supply network 418 which may provide a power supply voltage to function circuit 420. A function circuit 420 may execute predetermined functions upon receiving a sufficient power supply voltage on power supply network 418.

When any of p-n junctions 416 is forward biased, it may provide a supply voltage from its corresponding connection 402 to power supply network 418, and hence, provide power to function circuit 420. Such a power supply voltage may be a standard supply voltage that enables function circuit 402 to perform all of its intended functions. Alternatively, such a power supply voltage may be a wake voltage that allows function circuit 420 to execute operations that switch device 400 from a lower power consumption state, to a higher power consumption state.

In some embodiments, at the same time input signals cause p-n junctions 416 to be forward biased, such signals may also provide information to function circuit 420. In addition or alternatively, p-n junctions may be forwarded biased to provide wake power, and then reverse biased as standard power is applied. Once reverse biased, corresponding connections 402 may provide data input signals.

In this way, an integrated circuit may include p-n junctions formed in a substrate that may be forward biased by input signals at external connections to provide a power supply voltage to a function circuit.

Figure 5:
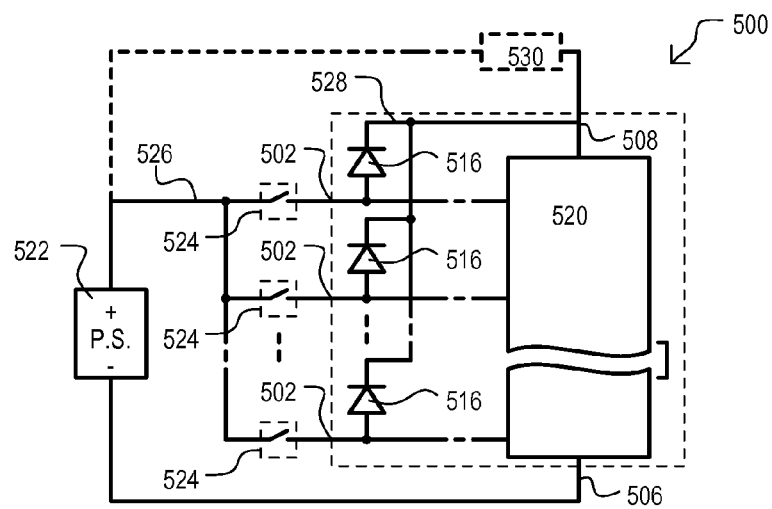
FIG. 5 is a block schematic diagram of an integrated circuit device according to a further embodiment.

Referring now to FIG. 5, an integrated circuit device according to still another embodiment is shown in a block schematic diagram and designated by the general reference character 500. An integrated circuit device 500 may include input connections 502, p-n junctions 516, a low power supply connection 506, a high power supply connection 508, a power supply voltage source 522, and input switches 524. One input switch 524 may correspond to each input connection 502.

In the particular embodiment of FIG. 5, a power supply voltage source 522 may provide a high supply voltage at a switch supply node 526, and a low supply voltage to low power supply connection 506. Each of input switches 524 may have one terminal connected to switch supply node 526, and another terminal connected to a corresponding input connection 502. Each of p-n junctions 516, which may be conceptualized as semiconductor diodes, may have a p-type portion (i.e., anode) connected to a corresponding input connection 502, and have an n-type portion (i.e., cathode) connected to a supply network 528. Supply network 528 may also be connected to a high power supply connection 508.

It is noted that each of input connections 502 may also be connected to a signal path to function circuit 520. That is, such input connections 506 are not dedicated power supply connections.

In operation, when any of input switches 524 is activated (placed into a low impedance state), a high supply voltage from power supply voltage source 522 may be applied to a p-type portion of the corresponding p-n junction 516. If a potential at the corresponding n-type portion is lower than the built-in potential of the junction, the junction may be forward biased, resulting in high power supply connection 508 being driven to a high potential (e.g., the supply voltage from source 522, less the built-in junction potential and any resistance voltage drop in the path). In some embodiments, such a high potential may be sufficient to provide standard power to function circuit 520. In other embodiments, such a high potential may provide a wake power to such a circuit that enables the subsequent application of standard power to the device.

Optionally, a device 500 may include a power supply control path 530 between power supply voltage source 522 and high power supply connection 508. A power supply control path 530 may alter a voltage at high power supply connection 508 from any voltage received on supply network 528. Particular examples of power supply control paths are shown in more detail below, and may include without limitation, a power supply switch and/or a voltage regulator.

Figure 6:
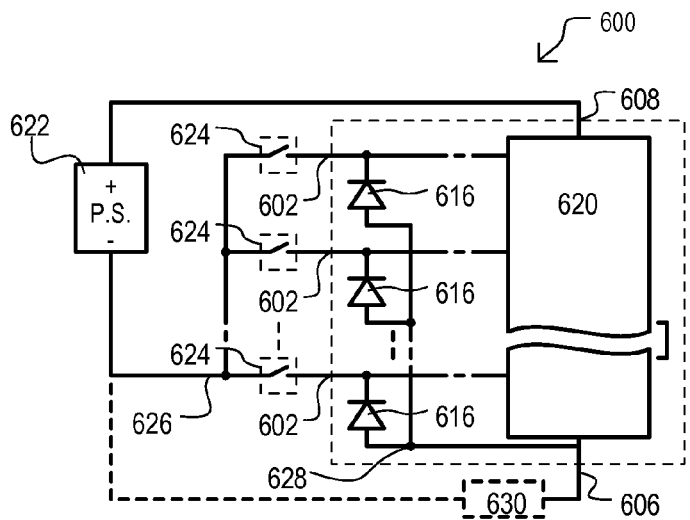
FIG. 6 is a block schematic diagram of an integrated circuit device according to yet another embodiment.

Referring to FIG. 6, an integrated circuit device according to still another embodiment is shown in a block schematic diagram and designated by the general reference character 600. Device 600 may include similar items to those shown in FIG. 5, accordingly, like items are referred to by the same reference character but with the first digit being a "6" instead of a "5".

The embodiment of FIG. 6 varies from that of FIG. 5 in that each of p-n junctions 616 may have an n-type portion (i.e., cathode) connected to a corresponding input connection 602, and have p-type portions (i.e., anodes) commonly connected at a supply network 628. Further, supply network 628 may be connected to a low power supply connection 606.

In operation, when any of input switches 624 is activated (placed into a low impedance state), a low supply voltage from power supply voltage source 622 may be applied to an n-type portion of the corresponding p-n junction 616. If the p-type portion is higher than the built-in potential of the junction, the junction may be forward biased, resulting supply network 628 being driven to a low potential (e.g., the low supply voltage from source 622, plus the built-in junction potential and resistance drop). In some embodiments, such a low potential may be sufficient to provide standard power to function circuit 620, or in other embodiments, such a low potential may provide wake power to such a circuit.

In this way, an integrated circuit device may include input connections with p-n junctions that may be forward biased by operation of switches to provide power to the integrated circuit.

Figure 7:
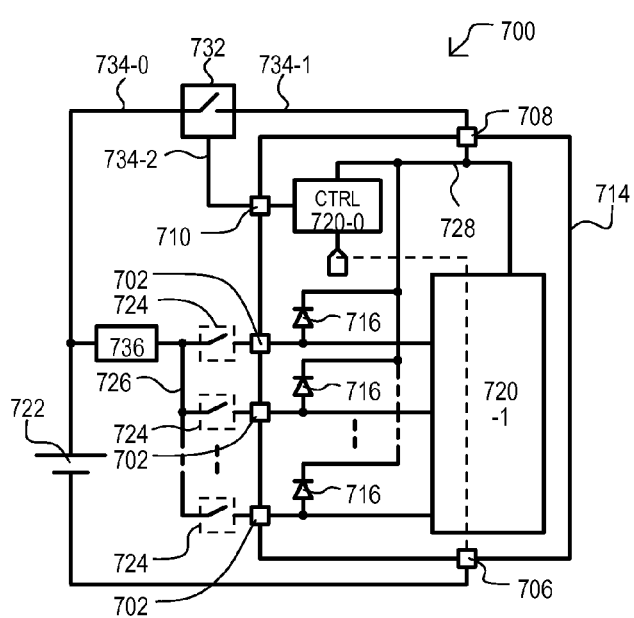
FIG. 7 is a block schematic diagram of an integrated circuit device according to another embodiment.

Referring now to FIG. 7, an integrated circuit device according to another embodiment is shown in block schematic diagram, and designated by the general reference character 700. Device 700 may include some items like those of FIG. 5, accordingly, like items are referred to by the same reference character but with the first digit being "7" instead of "5".

Unlike FIG. 5, FIG. 7 shows device 700 with a control section 720-0, function section 720-1, and p-n junctions 716 formed in a same semiconductor substrate 714 as sections 720-0/1. In addition, a power supply switch 732 may be disposed between a power supply voltage source 722 and a high power supply connection 708. Further, a current limiting impedance 736 may be formed between power supply voltage source 722 and switch supply node 726.

A control section 720-0 may be situated between supply network 728 and low power supply connection 706. Upon receiving a sufficient wake voltage due to the forwarding biasing of one or more p-n junctions 716, a control section 720-0 may activate a switch control signal at power supply switch output 710 to control power supply switch 732. Function section 720-1 may provide predetermined operations in response to various inputs, including inputs received on input connections 702.

A power supply switch 732 may have a power supply input 734-0 connected to power supply voltage source 722, a power supply output 734-1 connected to high power supply connection 708, and a control input 734-2 connected to power supply switch output 710. In response to a signal received at control input 734-2, power supply switch 732 may provide a low or high impedance between input 734-0 and output 734-1.

Current limiting impedance 736 may limit the amount of current flowing into substrate 714 when any of switches 724 is enabled, while at the same time, such an impedance may be selected to ensure a sufficient wake voltage drop is generated across control section 720-0 when a switch is initially enabled to wake device 700 from a low power consuming state to a higher power consuming state.

Particular wake operations for the embodiment of FIG. 7 will be described at a later point herein.

Figure 8A:
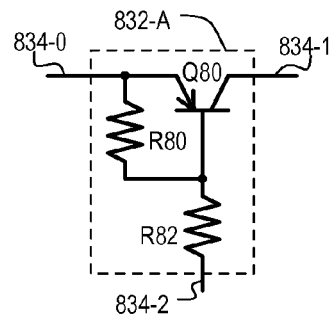
FIGS. 8A and 8B show high power supply switches that may be included in the embodiments.
Figure 8B:
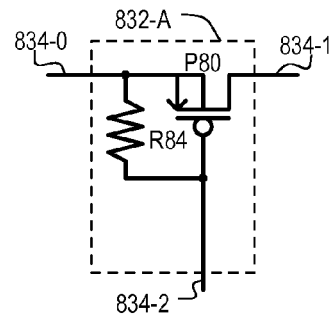

Referring to FIGS. 8A and 8B, particular examples of power supply switches that may be included in the embodiments are shown in schematic diagrams. In particular embodiments, such power supply switches may be included in power supply switch shown as 732 in FIG. 7.

Referring to FIG. 8A, a power supply switch 832-A may include a power supply input 834-0, power supply output 834-1, and a control input 834-2. A power supply switch 832-A may include a pnp bipolar transistor Q80, a first resistance R80, and a second resistance R82. Transistor Q80 may have an emitter connected to a power supply input 834-0, a collector connected to a power supply output 834-1, and a base. First resistance R80 may be connected between power supply input 834-0 and a base of Q80. Second resistance R82 may be connected between a base of transistor Q80 and control input 834-2.

Referring now to FIG. 8B, a power supply switch 832-B may have the same general configuration as that shown in FIG. 8A, however an insulated gate (e.g., MOS) type switch transistor P80 may be included in place of a pnp transistor.

Figure 9:
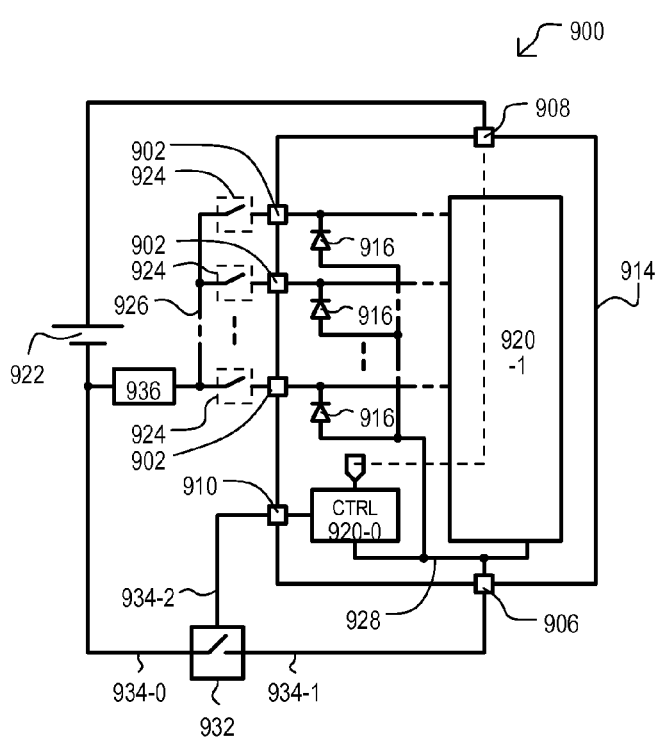
FIG. 9 is a block schematic diagram of an integrated circuit device according to another embodiment.

Referring to now to FIG. 9, an integrated circuit device according to another embodiment is shown in block schematic diagram, and designated by the general reference character 900. Device 900 may include some items like those of FIG. 6, accordingly, like items are referred to by the same reference character but with the first digit being "9" instead of "6".

FIG. 9 differs from FIG. 6 in that it includes features like that of FIG. 7. In particular, device 900 may include a control section 920-0, function section 920-1, and p-n junctions 916 formed in a same semiconductor substrate 914 as sections 920-0/1. In addition, a power supply switch 932 may be disposed between a power supply voltage source 922 and a low power supply connection 908, and a current limiting impedance 934 may be formed between power supply voltage source 922 and switch supply node 926.

Figure 10A:
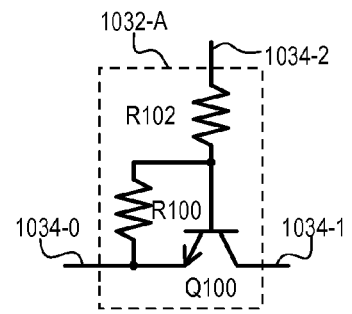
FIGS. 10A and 10B show low power supply switches that may be included in the embodiments.
Figure 10B:
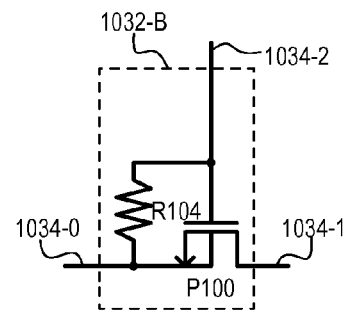

FIGS. 10A and 10B show particular examples of power supply switches that may be included in the embodiments. In particular embodiments, such power supply switches may be included in power supply switch shown as 932 in FIG. 9.

Referring to FIG. 10A, a power supply switch 1032-A may have the same general configuration as that shown in FIG. 8A, but includes an npn bipolar transistor Q100. Similarly, FIG. 10B shows a power supply switch 1032-B that may have the same general configuration as FIG. 8B, but with an n-channel insulated gate field effect transistor N100.

It is noted that while FIGS. 8A, 8B, 10A and 10B show transistor based circuits as a power supply switch, other embodiments may include alternate structures. For example, a power supply switch may include a relay or other electronically controlled switch.

In this way, an integrated circuit device may include a control section that activates a power supply switch in response to wake power applied by forward biasing one or more p-n junctions formed at input connections of the device.

Referring now to FIGS. 11A to 11C a "pull-down" input structure that may be included in the embodiments is shown in a block schematic diagram and designated by the general reference character 1100. FIG. 11A shows an input structure 1100 prior to a wake/input operation. FIG. 11B shows input structure 1100 during a wake/input operation. FIG. 11C shows input structure receiving a input signal in a standard operation.

Input structure 1100 may include an input connection 1102, a p-n junction 1116, a power supply voltage source 1122, an input switch 1124, a switch supply node 1126, a supply network 1128, a current limiting impedance 1136, a pull-down impedance 1138, and an input buffer 1140.

A pull-down impedance 1138 may be situated between input connection 1102 and a low power supply node 1142. In some embodiments, a pull-down impedance 1138 may be separate from an integrated circuit substrate containing p-n junction 1116. In other embodiments, a pull-down impedance 1138 may be formed in a same integrated circuit substrate as p-n junction 1116. A pull-down impedance 1138 may be switchable to selectively provide a pull-down function. As but one example, a switch (e.g., transistor) may be formed between a pull-down impedance 1138 and VSS.

An input buffer 1140 may have an input connected to input connection 1102 and an output that may provide a signal to other sections within an integrated circuit device. Input buffer 1140 may be formed in the same integrated circuit substrate as p-n junction 1116.

Referring to FIG. 11A, prior to a wake operation, an input switch 1124 may be open (i.e., high impedance state). As a result, pull-down impedance 1138 may drive input connection toward a low power supply voltage VSS. It is assumed at this time that supply network 1128 may be at a potential that maintains p-n junction 1116 in a reverse bias state (RB).

Referring to FIG. 11B, in a wake operation, an input switch 1124 may be closed (i.e., low impedance state). As a result, a positive supply voltage Vsupp+ may be applied to input connection 1102 through current limiting impedance 1136. It is assumed that such a potential is sufficient to place p-n junction 1116 into a forward biased state (FB), causing a wake voltage Vwake to be applied on supply network 1128. Such a voltage may activate other circuits that may wake a larger integrated circuit device. Optionally, the application of Vsupp+ at input connection 1102 may result in input buffer 1140 driving its output accordingly (in this case high).

Referring to FIG. 11C, in a standard operation, a supply network 1128 may be driven to a high power supply voltage VDD, which is assumed to be sufficient to reverse bias p-n junction 1116. In such an arrangement, when input switch 1124 is closed, a positive supply voltage Vsupp+ may be applied to input connection 1102 through current limiting impedance 1136. The application of Vsupp+ at input connection 1102 may result in input buffer 1140 driving its output accordingly (in this case high).

Referring now to FIGS. 12A to 12C a "pull-up" input structure that may be included in the embodiments is shown in a block schematic diagram and designated by the general reference character 1200. FIG. 12A shows an input structure 1200 prior to a wake/input operation. FIG. 12B shows input structure 1200 during a wake/input operation. FIG. 12C shows input structure receiving a signal in a standard input operation.

The embodiment of FIGS. 12A to 12C includes some of the same features as that of FIGS. 11A to 11C, thus like items are referred to by the same reference character but with the first digits being "12" and "11".

The embodiment of FIGS. 12A to 12C operates in the same general fashion as FIGS. 11A to 11C, but with a pull-up impedance 1244 pulling input connection 1202 toward a high power supply voltage VDD at a high power supply node 1246. Further, when input switch 1224 is closed, a low supply voltage (shown as VSS) is applied to input connection 1202 to forward bias p-n junction 1216 and provide a wake voltage (Vwake') in a wake mode (FIG. 12B), or result in input buffer 1240 driving its output accordingly (in this case low) in a standard mode (FIG. 12C). Like the embodiment of FIGS. 11A to 11C, a pull-up impedance 1244 may be switchable with respect to VDD.

In this way, input structures may include p-n junctions that are forward biased in a wake mode to provide wake power through an input connection, and then reverse biased in standard mode to allow input signals to propagate through the input connection.

Figure 13A:
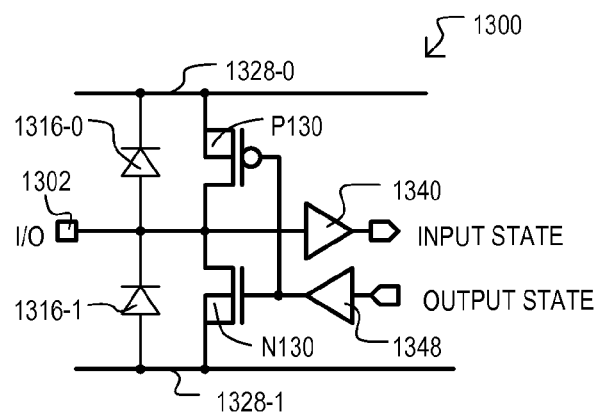
FIGS. 13A and 13B show a schematic diagram and cross sectional representation of an input/output (I/O) circuit with p-n junctions that may be included in embodiments.
Figure 13B:
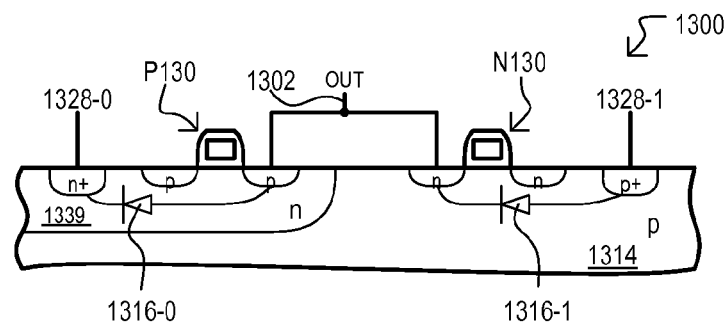

Referring now to FIGS. 13A and 13B an input/output (I/O) circuit that may be included in embodiments is shown in schematic diagram and cross sectional view, and designated by the general reference character 1300. I/O circuit 1300 may include a p-n junction that may be forward biased in a wake operation. Such a p-n junction may be a characteristic present in I/O circuit 1300. That is, such a p-n junction may be part of circuitry included in the I/O circuit having a function apart from providing a wake voltage.

Referring to FIG. 13A, an I/O circuit 1300 may receive input signals on an external connection and provide them to other circuits as signal INPUT STATE. I/O circuit 1300 may also receive signals internal signals (OUTPUT STATE) and drive such signals as output signals.

In the very particular embodiment of FIG. 13, an I/O circuit 1300 may include an I/O connection 1302, p-n junctions 1316-0/1, high supply network 1328-0, low supply network 1328-1, input buffer 1340, output control 1348, p-channel driver transistor P130, and n-channel driver transistor N130. In particular embodiments, p-n junctions 1316-0/1 are not separate from the other circuitry of I/O circuit 1300, and in one particular embodiment are formed by portions of transistors P130 and N130.

Input buffer 1340 may have an input connected to I/O connection 1302 and an output that provides signal INPUT STATE. Transistor P130 may have a source connected to high supply network 1328-0, a drain connected to I/O connection 1302, and a gate connected to an output of output control 1348. Transistor N130 may have a source connected to low supply network 1328-1, a drain connected to I/O connection 1302, and a gate connected to an output of output control 1348. Output control 1348 may commonly drive gates of transistors P130 and N130 to provide a path from I/O connection 1302 to either of high or low supply networks 1328-0/1.

It is noted that one of supply networks 1328-0/1 may be maintained at a power supply potential depending upon which p-n junction is forward biased to provide a wake power supply. For example, if a high wake voltage is applied by forwarding biasing p-n junction 1316-0, a low supply network 1328-1 may be maintained at a low power supply voltage (e.g., VSS). Conversely, if a low wake voltage is applied by forwarding biasing p-n junction 1316-1, a high supply network 1328-1 may be maintained at a high power supply voltage (e.g., VDD).

Referring to FIG. 13B, a portion of the circuit shown in FIG. 13A is represented by a cross sectional view. FIG. 13B shows transistors P130 and N130 formed in a substrate 1314. P-n junction 1316-0 may include a p-type drain diffusion of transistor P30, and n-type well 1339 portion of substrate 1314. P-n junction 1316-1 may include an n-type drain diffusion of transistor N30, and p-type substrate 1314.

Figure 14A:
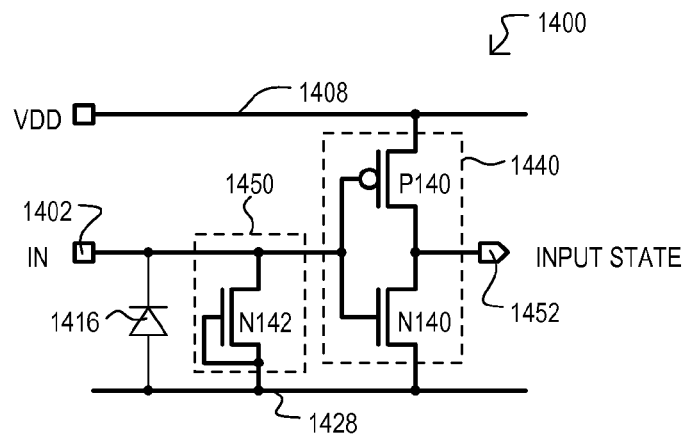
FIGS. 14A and 14B show a schematic diagram and cross sectional representation of an input circuit with p-n junctions that may be included in embodiments.
Figure 14B:
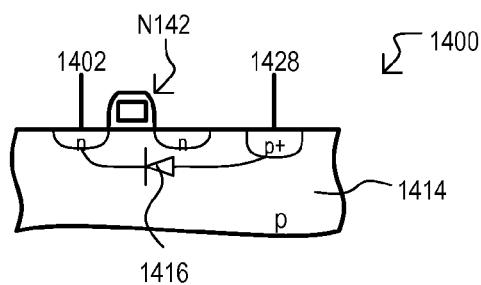

Referring now to FIGS. 14A and 14B an input circuit that may be included in embodiments is shown in schematic diagram and cross sectional view, and designated by the general reference character 1400. Input circuit 1400 may also include a p-n junction that may be forward biased in a wake operation. Such a p-n junction may be a characteristic already present in input circuit 1400. That is, such a p-n junction may be part of circuitry included in the I/O circuit having a function apart from providing a wake voltage.

Referring to FIG. 14A, an I/O circuit 1400 may receive input signals on external connection and provide them to other circuits as signal INPUT STATE. Input circuit 1400 may include an input connection 1402, p-n junction 1416, high power supply connection 1408, a low supply network 1428, an input buffer 1440, and an electrostatic discharge (ESD) protection circuit 1450. An input buffer 1440 may include p-channel input transistor P140 and n-channel input transistor N140. ESD protection circuit 1450 may include p-channel transistor N142.

In particular embodiments, p-n junction 1416 is not separate from the other circuitry of input circuit 1400, and may be formed by portions of transistors N142.

Input 1440 may have an input connected to I/O connection 1402 and an output that provides signal INPUT STATE. Transistor P140 may have a source connected to high supply connection 1408, a drain connected to an input signal node 1452, and a gate connected to input connection 1402. Transistor N140 may have a source connected to low supply network 1428, a drain connected to input signal node 1452, and a gate connected to input connection 1402. Transistor P142 of ESD protection circuit 1450 may have a drain connected to input connection 1402 and a source and gate connected to low supply network 1428.

Referring to FIG. 14B, a portion of the circuit shown in FIG. 14A is represented by a cross sectional view. FIG. 14B shows transistor P142 formed in a substrate 1414. P-n junctions 1416 may include an n-type drain region of transistor N142, as well as p-type substrate 1414.

In this way, diode type structures, such as p-n junctions as but one example, may be forward biased to provide a wake voltage and may be structures already present in input and/or output circuitry.

Figure 15A:
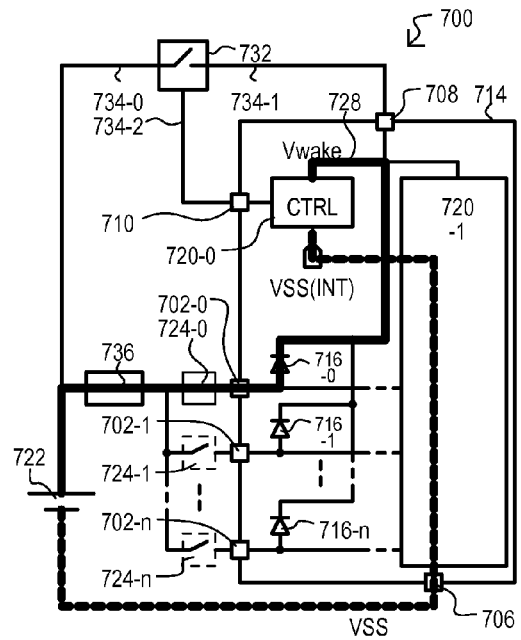
FIGS. 15A to 15C are a sequence of block schematic diagrams showing a wake operation for the embodiment shown in FIG. 7.
Figure 15B:
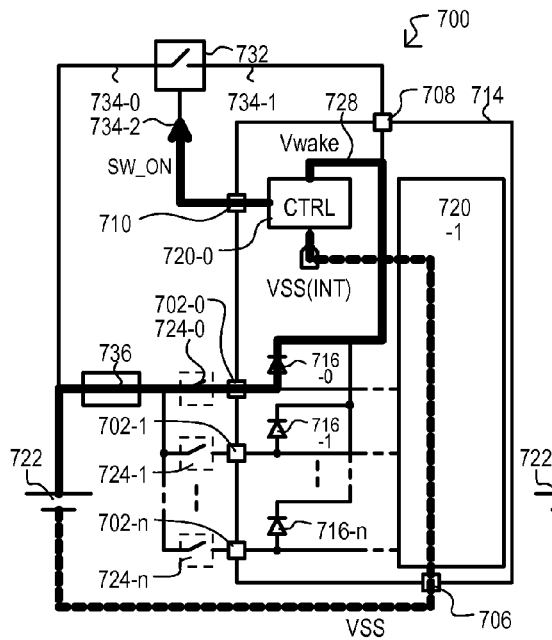
Figure 15C:
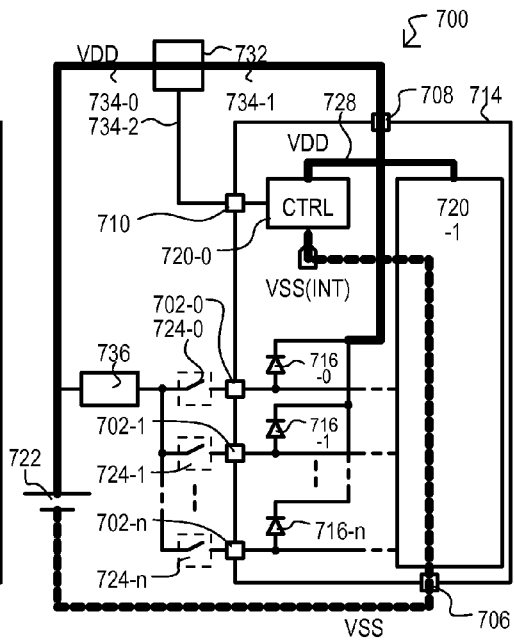

Referring now to FIGS. 15A to 15C a particular wake operation for the embodiment of FIG. 7 is a shown in sequence of block schematic diagrams. It is assumed that prior to the actions shown in FIG. 15A, a device 700 may be in a low power consuming sleep mode.

Referring to FIG. 15A, at the start of wake operation any input switches 724-0 to 724-n may be closed. In the particular example shown, input switch 724-0 may be closed. As but one example, such a switch may be closed by pushing a button on electronic device, or some other switching mechanism (e.g., reed switch, etc.). As a result, a high power source voltage (shown by a bold solid line) may be applied through current limiting impedance 736 to multifunction connection 702-0. This voltage may forward bias p-n junction 716-0, applying a wake voltage to at least control section 720-0. A low power supply voltage (shown by a bold dashed line) may be applied to control section 720-0 through low power supply connection 706.

Referring to FIG. 15B, upon receiving a wake voltage (Vwake) and a low power supply voltage (VSS), control section 720-0 may generate a switch on signal (SW_ON) at power supply switch output 710, which may be applied to a control input 734-2 of power supply switch 732.

Referring to FIG. 15C, in response to signal SW_ON, power supply switch 732 may apply a standard high power supply voltage (VDD) at high power supply connection 708. This may drive VDD on supply network 728, which may reverse bias p-n junction 716-0 and provide a full power supply voltage to function section 720-1. Consequently, function section 720-1 may execute predetermined operations in response to input signals received on connections 702-0 to 702-n.

In this way, a device may be woken from a sleep mode into a fully operational mode by a voltage applied at any one of multiple input connections.

Figure 16:
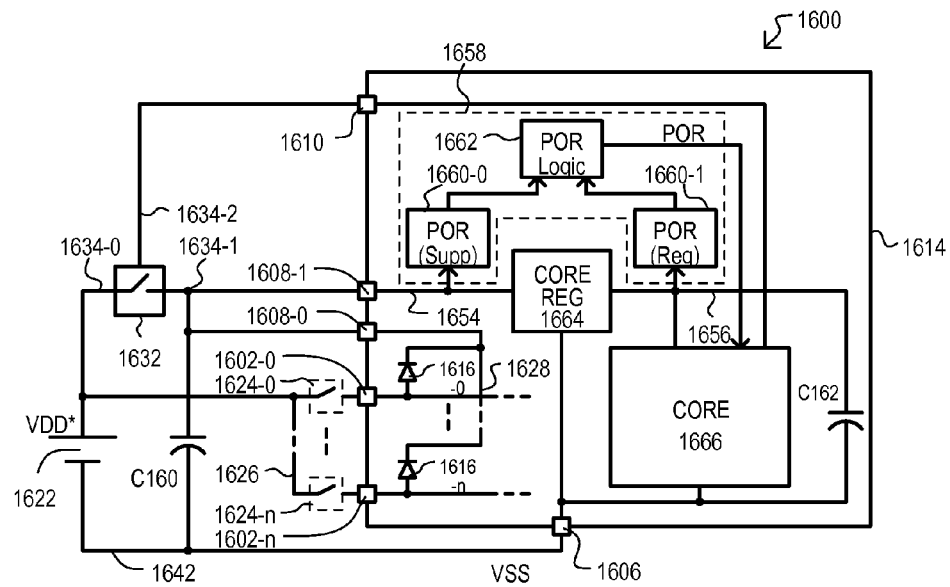
FIG. 16 is a block schematic diagram of an integrated circuit device according to another embodiment.

Referring now to FIG. 16, a semiconductor device according to yet another embodiment is shown in a block schematic diagram and designated by the general reference character 1600.

Device 1600 may include items like those shown in the embodiment of FIG. 7. Such like items are referred to by the same reference character but with the leading digits being "16" instead of "7".

FIG. 16 differs from FIG. 7 in that it may include two different high power supply connections: an I/O high power supply connection 1608-0, and a main high power supply connection 1608-1. Further, FIG. 16 also shows a power on reset (POR) section 1658, a voltage regulator 1664, and a core section 1666. It is noted that while power supply connections 1608-0 and 1608-1 are shown connected externally, in other embodiments, such a connection may be made internally.

An I/O high power supply connection 1608-0 may provide a high power supply voltage to I/O circuits, including to supply network 1628. A main high power supply connection 1608-1 may provide a power supply voltage for other circuits within a device 1600, including POR section 1658 and voltage regulator circuit 1664. I/O and main high power supply connections (1608-0 and 1608-1) may be commonly connected to power supply output 1634-1 from power supply switch 1632.

In a standard operation mode (i.e., not a sleep or wake mode), a device 1600 may operate with two different power supply voltages. A regulated power supply voltage (VCC) may be applied on a second internal power supply node 1656, while a larger main power supply voltage (VDD) may be applied on a first internal power supply node 1654.

A POR section 1658 may have one input connected to first internal power supply node 1654, another input connected to second internal power supply node 1656, and an output that provide a POR signal to core 1666. A POR section 1658 may activate signal POR in response to predetermined stable voltage levels being achieved on first and second internal power supply node (1654 and 1656). In the very particular embodiment of FIG. 16, a POR section 1658 may include a supply POR circuit 1660-0, a regulated POR circuit 1660-1, and POR logic 1662. A supply POR circuit 1660-0 may monitor a voltage at first internal power supply node 1654, and in response to such a voltage, provide an output signal to POR logic 1662. In a similar fashion, a regulated POR circuit 1660-1 may monitor a voltage at second internal power supply node 1656, and in response to such a voltage, provide a second output signal to POR logic 1662. POR logic 1662 may output POR signal to core section 1666. In a very particular embodiment, supply POR circuit 1660-0 may activate its output in response to a wake voltage at first supply node 1654, which may be less than a VDD value. Similarly, a regulated POR circuit 1660-1 may activate its output in response to a regulated wake voltage at second supply node 1656, which may be less than a VCC value.

A voltage regulator circuit 1664 may regulate a voltage received at first internal power supply node 1654 to generate a regulated power supply voltage at second internal power supply node 1656. In a particular embodiment, a regulated voltage may be lower than that at a first power supply node 1654. More particularly, in a standard mode of operation, voltage regulator circuit 1664 may receive a voltage VDD at first internal power supply node 1654, and regulate such a voltage to generate VCC on second internal power supply node 1656. Similarly, in a wake mode of operation, voltage regulator circuit 1664 may receive a main wake voltage (Vwmain) on first internal power supply node 1654, which may be less than VDD, and regulate such a voltage to generate a regulated wake voltage Vwreg on second internal power supply node 1656, where Vwreg may be less than or equal to VCC.

A core section 1666 may provide predetermined functions, for example, execute operations in response to input signals received on any of connections 1602-0 to 1602-n. A core section 1666 may operate on the regulated power supply voltage at second internal power supply node 1656.

It is noted that while capacitor C162 is shown as an internal component, in other embodiments, such a capacitor may be an external component connected to an external power supply connection.

Figure 17A:
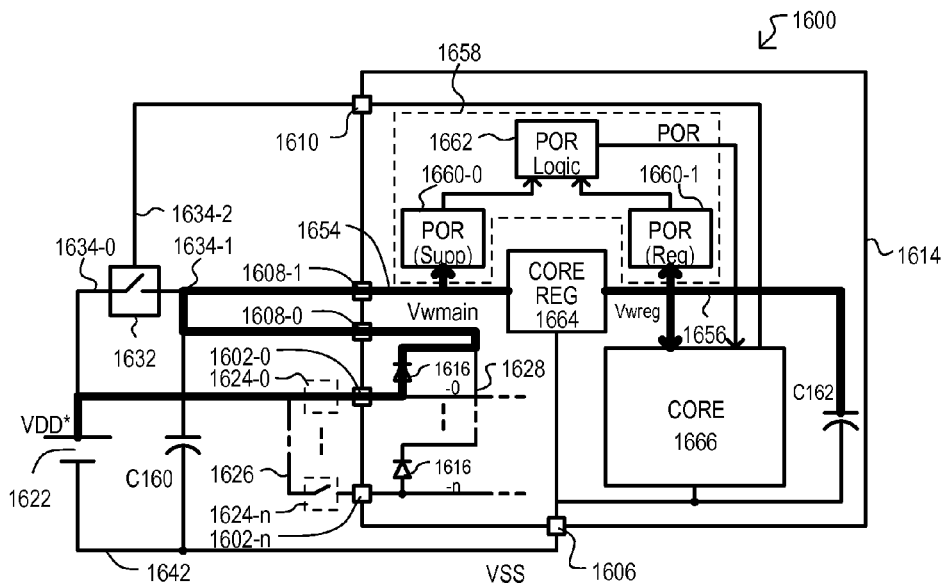
FIGS. 17A to 17C are a sequence of block schematic diagrams showing a wake operation for the embodiment shown in FIG. 16.
Figure 17B:
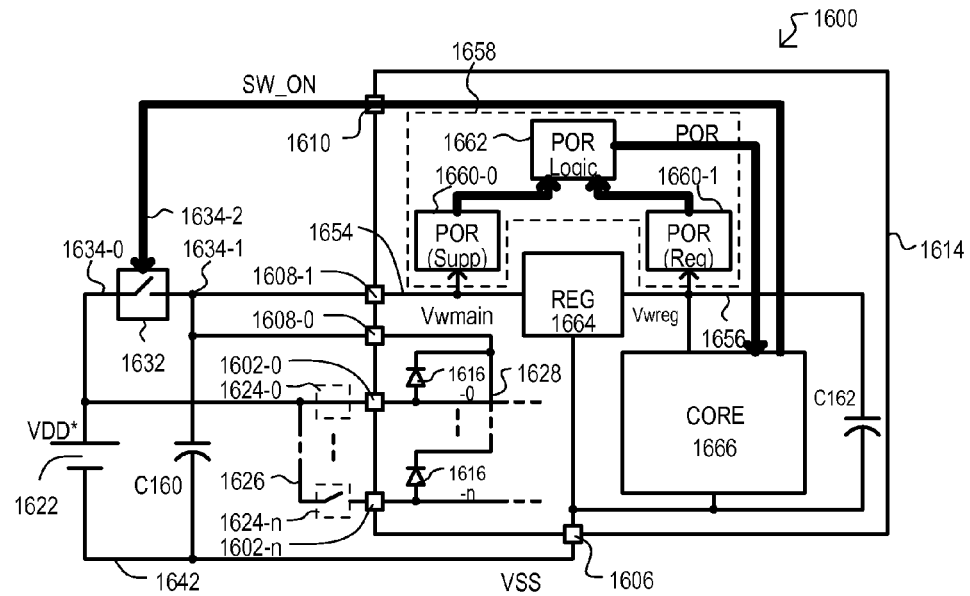
Figure 17C:
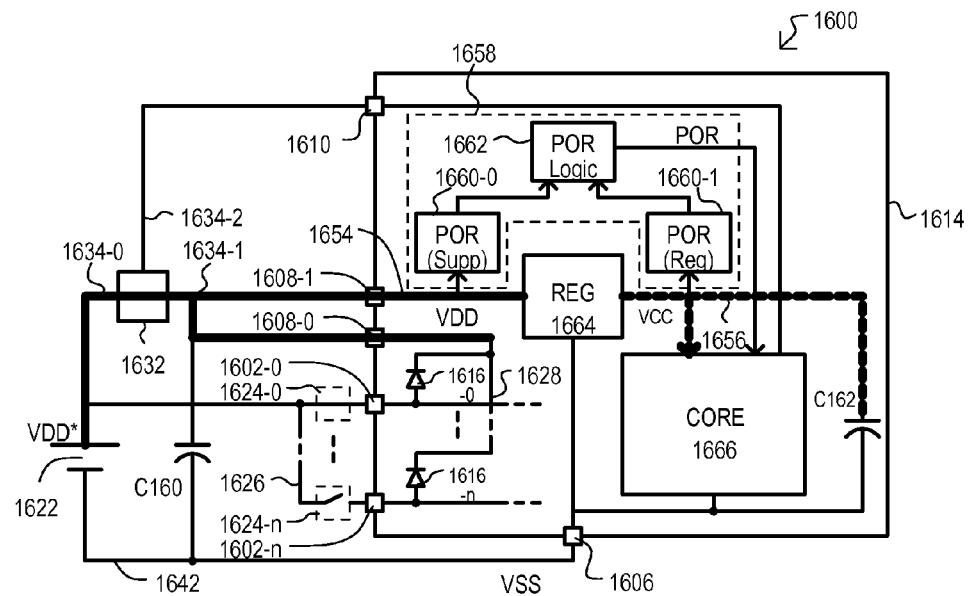

Referring now to FIGS. 17A to 17C a particular wake operation for the embodiment of FIG. 16 is a shown in sequence of block schematic diagrams. It is assumed that prior to the actions shown in FIG. 17A, a device 1600 may be in a low power consuming sleep mode.

Referring to FIG. 17A, any of input switches 1624-0 to 1624-n may be closed. In the operation shown, input switch 1624-0 may be closed. As a result, a high power source voltage (shown by a bold solid line) may be applied to multifunction connection 1602-0. This voltage may forward bias p-n junction 1616-0, applying a main wake voltage (Vwmain) to first internal power supply node 1654 via I/O and main power supply connections (1608-0 and 1608-1). As noted previously, in other embodiments a supply network 1628 may be directly connected to internal power supply node 1654, in which case a wake voltage may be applied to power supply node 1654 directly via a multifunction connection (e.g. 1602-0 to 1602-n). In response to main wake voltage (Vwmain), voltage regulator circuit 1664 may generate a regulated wake voltage (Vwreg). Supply POR circuit 1660-0 may monitor voltage Vwmain, while regulated POR circuit 1660-1 may monitor voltage Vwreg.

Referring to FIG. 17B, it is assumed that supply POR circuit 1660-0 determines that voltage Vwmain is within predetermined tolerances, and so activates an output signal applied to POR logic 1662. It is also assumed that regulated POR circuit 1660-1 determines that voltage Vwreg is within predetermined tolerances, and so activates its corresponding output signal to POR logic 1662. In response to such indications from both POR circuits (1660-0 and 1660-1), POR logic 1662 may activate a POR signal. Upon receiving an active POR signal, a core section 1666 may activate a switch-on signal (SW_ON) that is applied to power supply switch 1632.

Referring to FIG. 17C, in response to signal SW_ON, power supply switch 1632 may apply a standard high power supply voltage (VDD) at I/O and main high power supply connections 1608-0/1. This may reverse bias p-n junction 1616-0 and provide a full power supply voltage (VDD) at first internal power supply node 1654. In response to VDD and first power supply node 1654, voltage regulator circuit 1654 may generate a fully regulated voltage VCC at second internal power supply node 1656.

In this way, a device having separately voltage regulated sections may be woken from a sleep mode into a fully operational mode by a signal applied at an input connection.

Figure 18A:
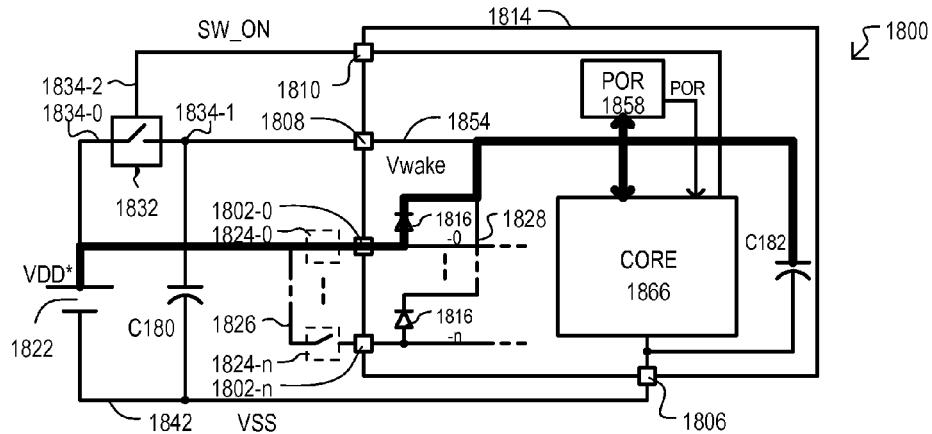
FIGS. 18A to 18C are a sequence of block schematic diagrams showing a wake operation for another embodiment.
Figure 18B:
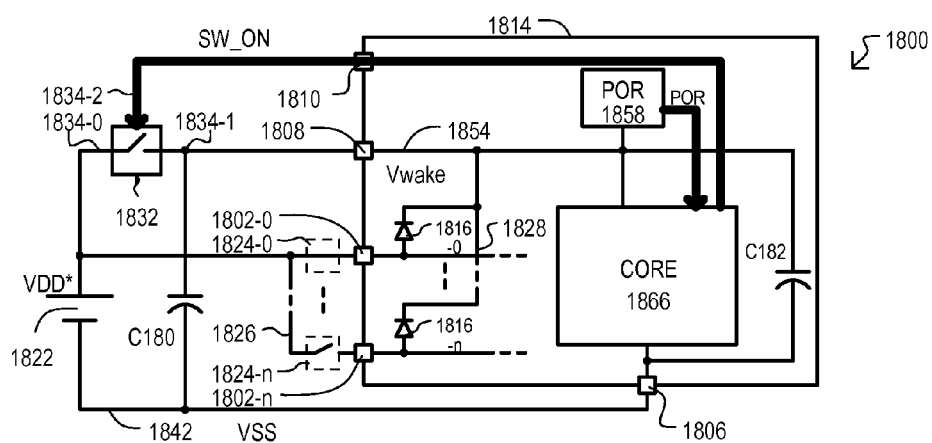
Figure 18C:
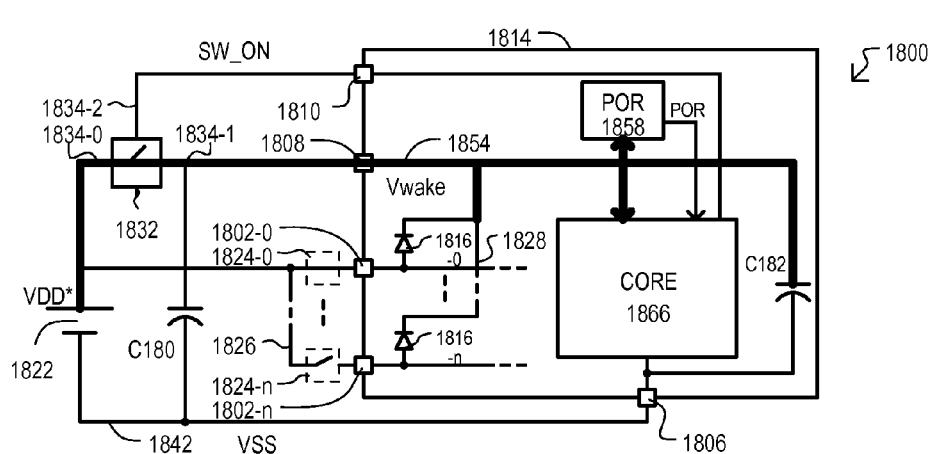

Referring now to FIG. 18A to 18C, a semiconductor device according to another embodiment is shown in a block schematic diagram and designated by the general reference character 1800. Device 1800 may include items like those shown in the embodiment of FIG. 16. Such like items are referred to by the same reference character but with the leading digits being "18" instead of "16".

The embodiment shown in FIGS. 18A to 18C differs from that of FIG. 16 in that it does not include a voltage regulator, and a POR section 1858 monitors a voltage at a single power supply node 1845.

Referring now to FIGS. 18A to 18C a particular wake operation for device 1800 will now be described.

Referring to FIG. 18A, any of input switches 1824-0 to 1824-n may be closed (in this case 1824-0), resulting in a high power source voltage (shown by a bold solid line) may be applied to multifunction connection 1802-0. This voltage may forward bias p-n junction 1816-0, applying a wake voltage (Vwake) to internal power supply node 1854. POR section 1858 may monitor voltage Vwake.

Referring to FIG. 18B, it is assumed that supply POR section 1858 determines that voltage Vwake is within predetermined tolerances, and so activates a POR signal. Upon receiving an active POR signal, a core section 1866 may activate a switch-on signal (SW_ON) that is applied to power supply switch 1832.

Referring to FIG. 18C, in response to signal SW_ON, power supply switch 1832 may apply a standard high power supply voltage (VDD) at power supply connection 1808. This may reverse bias p-n junction 1816-0 and provide a full power supply voltage (VDD) at internal power supply node 1854.

In this way, a device having separately powered internal sections may be woken from a sleep mode into a fully operational mode by a signal applied at an input connection.

Figure 19:
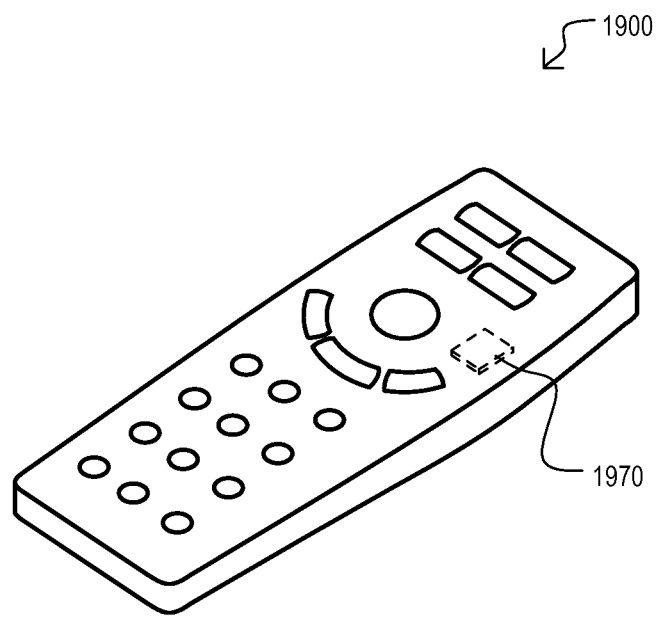
FIG. 19 is a perspective view showing an electronic device according to an embodiment.

Referring now to FIG. 19, an electronic device according to a further embodiment is shown in a perspective view and designated by the general reference character 1900. A device 1900 may be an electronic device having multiple inputs any of which can be activated to switch the device from a low power consuming "sleep" mode to a fully functional active mode. In particular embodiments, such inputs do not include a "wake" input (i.e., one input dedicated to waking a device from the sleep mode). Further, in other embodiments, such inputs are not periodically scanned by applying voltages in sequences at particular locations.

A device 1900 may include an integrated circuit device according to any of the embodiments shown above, or equivalents. Multiple (or all) inputs of the electronic device 1900 may be connected to multifunction connections of the integrated circuit device. In such an arrangement, when any input of device 1900 is activated, the device may wake from the sleep mode.

In the very particular embodiment of FIG. 18, a device 1900 may be a remote control having an integrated circuit device 1970 assembled therein. Integrated circuit device 1970 may include devices shown in the above embodiments or equivalents.

In this way, an electronic device may be switched between a sleep mode and an active mode by operation of any of multiple inputs on the device.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A circuit, comprising:
   an integrated circuit (IC);
   a plurality of external connections, each of the external connections configured to provide a power voltage path for a power supply voltage to the IC and an information signal path to the IC, wherein a p-n junction of at least one external connection is biased in a first direction to provide the power voltage path to the IC and biased in an opposite direction to provide the information signal path; and
   a plurality of switches, each coupled to a corresponding external connection of the plurality of external connections, each of the plurality of switches configured to provide the power supply voltage through the corresponding external connection, wherein the power supply voltage is the only source of power to the IC in a power mode of the circuit.

2. The circuit of claim 1, further including at least two power supply connections, separate from the external connections, dedicated to providing the power supply voltage to the IC.

3. The circuit of claim 1, wherein the external connections comprise input/outputs (I/Os) configurable to receive an input data signal or output a data signal, wherein in a wake mode, each external connection to provide initial power to the IC, and in a standard mode, each external connection to provide the information signal path, and not to provide operational power to the IC.

4. The circuit of claim 3, wherein the I/Os comprise general purpose I/Os (GPIOs), and the standard mode includes a digital mode in which a GPIO is to input or output a digital signal, or an analog mode in which a GPIO is to input an analog signal.

5. The circuit of claim 1, wherein each external connection is coupled to a power supply network of the IC through a corresponding p-n junction formed in a semiconductor substrate of the integrated circuit, wherein a p-n junction of at least one external connection is forward biased when powering the IC and reverse biased when providing at least the information signal path.

6. The circuit of claim 5, further including:
   a control circuit having a power supply input coupled to the power supply network, the control circuit configured to activate a switch control signal at a switch control output of the IC in response to a wake voltage at the power supply network; and
   a power switch device having a switch path coupled between a power supply and a dedicated power supply connection of the IC, and a control input coupled to the switch control output.

7. The circuit of claim 5, wherein the corresponding p-n junction of each external connection is a structure in a signal input or output driving circuitry coupled to the external connection that is reversed biased when receiving a signal input or driving an output.

8. A circuit, comprising:
   an integrated circuit;
   a plurality of external signal connections configured to receive information signals;
   a plurality of switches, each coupled to a corresponding one of the plurality of external signal connections, each external signal connection configured to receive a wake voltage through a corresponding switch;
   a control circuit configured to receive operational power from an internal power supply network, the internal power supply network coupled to an external power supply connection and to the plurality of external signal connections by diode type structures, the control circuit configured to activate a power supply switch enable signal in response to at least the wake voltage provided by a forward biasing of at least one of the diode type structures; and
   a power supply switch circuit configured to couple a power supply voltage to the external power supply connection in response to the power supply switch enable signal, wherein the power supply voltage is the only source of power to the integrated circuit in a power mode of the circuit.

9. The circuit of claim 8, wherein the switch circuit is formed in a different semiconductor substrate than the control circuit.

10. The circuit of claim 8, further including a voltage regulator circuit having a regulator input coupled to the diode type structures and the external power supply connection, and a regulator output coupled to a first internal power supply node, the voltage regulator circuit configured to provide a regulated supply voltage at the regulator output in response to a voltage higher than the regulated supply voltage being received at the regulator input.

11. The circuit of claim 10, further including a power-on reset circuit configured to activate a power-on reset signal in response to a first predetermined voltage at the external power supply connection and the regulated supply voltage at the first internal power supply node, wherein the control circuit is configured to activate the power supply switch enable signal in response to at least the wake voltage provided by the forward biasing of at least one of the diode type structures and the power-on reset signal.

12. The circuit of claim 8, further including an assembly having the plurality of switches, wherein the control circuit is formed in another integrated circuit included in the assembly, and each external signal connection is coupled to a different switch.

13. The circuit of claim 12, wherein the assembly comprises a remote control unit for sending control signals to another device.

14. A method, comprising:
activating any one of a plurality of input switches, each one of the plurality of input switches coupled to a corresponding signal connection, each signal connection configured to receive information signals;
responsive to the activating of the any one of the plurality of input switches, providing wake power to an integrated circuit (IC) by forward biasing a diode type structure formed at the corresponding signal connection, wherein the corresponding signal connection is different from any dedicated power supply input to the integrated circuit, wherein the wake power is the only source of power to the integrated circuit when the wake power is provided; and
responsive to the wake power, enabling a power supply switch device to provide standard power to the integrated circuit via at least one dedicated power supply unit.

15. The method of claim 14, wherein the enabling of the power supply switch device includes enabling the power supply switch in response to the forward biasing of any one of a plurality of diode type structures providing an initial power supply to a voltage regulator.

16. The method of claim 14, further comprising, after providing standard power via at least one dedicated power supply input, receiving input data signals via the corresponding signal connection.

17. The method of claim 14, further including reverse biasing the diode type structures in response to providing the standard power.

18. The method of claim 17, wherein the activating of the any one of the plurality of input switches includes activating the any one of the plurality of input switches in response to a corresponding button of an electronic device.

* * * * *